(12) United States Patent
Mallmann (10) Patent No.: US 9,822,833 B2
(45) Date of Patent: Nov. 21, 2017

(54) GUIDING MEANS FOR A BRAKE LINING ARRANGEMENT

(71) Applicant: Lucas Automotive GmbH, Koblenz (DE)

(72) Inventor: Markus Mallmann, Pfalzfeld (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 0 days.

(21) Appl. No.: 14/404,691

(22) PCT Filed: May 28, 2013

(86) PCT No.: PCT/EP2013/060929
§ 371 (c)(1),
(2) Date: Dec. 1, 2014

(87) PCT Pub. No.: WO2013/178610
PCT Pub. Date: Dec. 5, 2013

(65) Prior Publication Data
US 2015/0107944 A1    Apr. 23, 2015

(30) Foreign Application Priority Data
Jun. 1, 2012 (DE) .................. 10 2012 010 932

(51) Int. Cl.
  *F16D 65/09* (2006.01)
  *F16D 65/097* (2006.01)
  *F16D 65/00* (2006.01)

(52) U.S. Cl.
  CPC ..... *F16D 65/0978* (2013.01); *F16D 65/0006* (2013.01); *F16D 65/0972* (2013.01)

(58) Field of Classification Search
None
See application file for complete search history.

(56) References Cited

U.S. PATENT DOCUMENTS 5,687,817 A * 11/1997 Kobayashi ............ F16D 65/097
                                                                188/72.3
5,699,882 A * 12/1997 Ikegami .............. F16D 65/0972
                                                                188/205 A (Continued)

FOREIGN PATENT DOCUMENTS

DE          69610236 T2     1/2001
EP           2088346 A1     8/2009

(Continued)

*Primary Examiner* — Bradley King
*Assistant Examiner* — James Hsiao
(74) *Attorney, Agent, or Firm* — MacMillan, Sobanski & Todd, LLC (57) ABSTRACT

A guiding means for a brake lining arrangement of a disc brake, comprising a main part which comprises a guiding portion provided for guiding a guiding projection of the brake lining arrangement and which comprises a fixing portion which is used to fix the guiding means to a brake support. The fixing portion has two contact surfaces and a stop surface which connects the two contact surfaces. At least one elastic retaining bracket is provided on the stop surface, the retaining bracket being in secure engagement with the brake support at least in some sections, and at least the stop surface is provided with a retaining portion which can be brought into contact with the brake support at least in some sections.

11 Claims, 10 Drawing Sheets

(56) References Cited

U.S. PATENT DOCUMENTS

| | | | |
|---|---|---|---|
| 5,901,815 A | | 5/1999 | Kobayashi et al. |
| 5,954,163 A | * | 9/1999 | Suzuki ................. F16D 55/227 188/250 G |
| 6,003,642 A | * | 12/1999 | Mori .................. F16D 65/0977 188/73.37 |
| 6,527,090 B1 | | 3/2003 | Barillot et al. |
| 9,016,442 B2 | * | 4/2015 | Odaira ................. F16D 55/226 188/72.3 |
| 9,206,867 B2 | * | 12/2015 | Lou ..................... F16D 65/0006 |
| 2006/0070828 A1 | * | 4/2006 | Hendrich ........... F16D 65/0972 188/73.31 |
| 2007/0137952 A1 | * | 6/2007 | Cortinovis .......... F16D 65/0972 188/73.38 |
| 2007/0205061 A1 | | 9/2007 | Yagi |
| 2007/0251772 A1 | * | 11/2007 | Tsurumi ............... F16D 65/095 188/73.38 |
| 2010/0243385 A1 | * | 9/2010 | Kaneko .............. F16D 65/0977 188/73.31 |
| 2011/0073418 A1 | * | 3/2011 | Kim ................... F16D 65/0972 188/73.43 |
| 2011/0120821 A1 | * | 5/2011 | Shimamura ......... F16D 65/0972 188/234 |
| 2011/0168503 A1 | * | 7/2011 | Chelaidite .......... F16D 65/0972 188/73.31 |
| 2012/0205205 A1 | * | 8/2012 | Lethorn ............. F16D 65/0977 188/234 |
| 2013/0025981 A1 | * | 1/2013 | Maehara .............. F16D 55/227 188/72.3 |

FOREIGN PATENT DOCUMENTS

| | | |
|---|---|---|
| JP | 8-226470 A | 9/1996 |
| JP | 20010336554 A | 12/2001 |
| JP | 20100107001 A | 5/2010 |

* cited by examiner

GUIDING MEANS FOR A BRAKE LINING ARRANGEMENT

CROSS-REFERENCE TO RELATED APPLICATIONS

This application is a national stage of International Application No. PCT/EP2013/060929 filed May 28, 2013, the disclosures of which are incorporated herein by reference in entirety, and which claimed priority to German Patent Application No. DE 10 2012 010 932.6 filed Jun. 1, 2012, the disclosures of which are incorporated herein by reference in entirety.

BACKGROUND OF THE INVENTION

The present invention relates to a guiding means for a brake pad arrangement of a disk brake, with a base body which comprises a guiding section provided for guiding a guiding protrusion of the brake pad arrangement, and a fixing section which is provided for fixing the guiding means to a brake carrier, wherein the fixing section has two contact surfaces and a stop surface connecting the two contact surfaces, and at least one elastic holding bracket is provided on the stop surface, which holding bracket is in holding engagement with the brake carrier at least in some sections.

Such guiding means are known from the prior art and are disclosed for example in the document U.S. Pat. No. 6,527,090 B1. The document describes a spring element acting as guiding means, the spring element having a first section which can be attached to a support bracket of a disk brake and a second section which can receive a protrusion of a brake pad. The first section has two elastic holding arms which are provided on opposite side edges of the first section. The two holding arms on the sides of the first section of the spring element bear against opposite side faces of a protrusion on the support bracket so as to be able to keep the spring element in its position on the protrusion of the support bracket. To this end, the two holding arms according to the document U.S. Pat. No. 6,527,090 are bent toward the support bracket at bending sites which are located on the side edges of the spring element, that is to say the holding arms are formed elastically on the spring element.

The holding arms of the spring element or of the guiding means are arranged on the support bracket in such a way that they are oriented in the direction of the actuation force of the brake pad arrangement. The holding arms of the spring element are thus loaded when the brake pad arrangement is actuated with the actuation force, since they are intended to keep the spring element in its predetermined position on the protrusion of the support bracket counter to the actuation force of the brake pad arrangement.

In order that the holding arms of the spring element can withstand the loads brought about by the actuation force of the brake pad arrangement and also the vibrations that occur during operation of a vehicle, the elastic holding arms of the spring element must be suitably designed, that is to say suitably dimensioned for these loads.

One problem addressed by the present invention is that of providing a guiding means which has greater stiffness and greater strength while using less material.

This problem is solved by a guiding means for a brake pad arrangement according to claim 1.

Preferred embodiments will become apparent from the appended dependent claims 2 to 9.

BRIEF SUMMARY OF THE INVENTION

In order to solve the problem described above, the stop surface of the guiding means according to the invention is provided with a holding section which can be brought into contact with the brake carrier at least in some sections.

As a result of being formed in the stop surface, the holding section has a high degree of stiffness so that the strength and stiffness of the guiding means as a whole can be increased without any need for additional material. Furthermore, by providing the stiff holding section—in comparison to the prior art—there is no need for an elastic holding arm.

With the guiding means according to the invention, the amount of material required in order to manufacture the guiding means can be considerably reduced, which leads to a reduction in manufacturing costs.

The holding section is arranged on the guiding means in such a way that, in the state attached to a brake carrier, the stiffened holding section is loaded by the actuation force of the brake pad arrangement. As a result, the guiding means can be reliably held in its predetermined position on the brake carrier and the lifespan of the guiding means can be increased.

According to one embodiment of the present invention, the holding section may comprise at least one holding surface which serves to bear against the brake carrier.

The holding surface may run in an angled manner relative to the stop surface in such a way that it extends substantially parallel to the contact surfaces of the fixing section of the guiding means. Depending on the configuration of the brake carrier, the holding section or the holding surface may bear against the brake carrier either in a flat manner or with one of its side edges and can absorb the occurring forces and loads. It is of course possible that the holding surface bears against the brake carrier in a flat manner and with one of its side edges.

In this connection, it should also be mentioned that the holding surface is angled along an edge which extends substantially perpendicular to the side edges of the fixing section or to the side edges of the guiding element. The length of the edge at which the holding surface is angled, and the associated size of the holding surface, serve to set the stiffness of the holding section. Since the edge runs parallel to the direction in which the forces and loads occur in the installed state of the guiding element in a brake carrier, that is to say to the direction of the actuation force of the brake pad arrangement, these loads can be absorbed over the length of the edge and the size of the holding surface. Such a holding section provides a very high degree of stiffness without any need for additional material.

According to one embodiment of the invention, the holding section may extend between the stop surface and at least one of the contact surfaces. The holding surface may in this case be connected to at least one of the contact surface. In other words, the holding section may be formed by a holding surface running parallel to the contact surfaces and by a further surface section running substantially parallel to the stop surface. The further surface section then merges into one of the contact surfaces.

Preferably, the holding surface may be provided with a bulge which may help to fix the guiding means on the brake carrier. The bulge on the holding surface may serve for acting on the brake carrier and may engage for example in a depression on the brake carrier.

According to one further development of the invention, lateral insertion tabs may be formed on the guiding section. The insertion tabs on the guiding section of the guiding means facilitate the insertion of a guiding protrusion of the brake pad arrangement into the guiding section of the guiding means. For this purpose, the lateral insertion tabs may be configured in an angled manner, so that less precision is required when positioning the guiding protrusion of the brake pad arrangement during the insertion process. The insertion tabs guide or "center" the guiding protrusion in the guiding section.

Furthermore, at least one stop tongue may be formed on the guiding means, which stop tongue serves to position the guiding means on the brake carrier.

Preferably, the base body of the guiding element may have a substantially S-shaped configuration.

According to one preferred embodiment, the guiding means may be made of sheet metal. In this case, the guiding means may be formed in one piece.

The present invention further relates to a disk brake for a motor vehicle brake system comprising a brake pad arrangement which has a brake pad carrier and a brake pad attached to the brake pad carrier, which brake pad can be brought into interaction with a brake disk in order to achieve a braking effect, a brake carrier which has at least one receiving region and at least one fixing region, and a guiding means of the type described above which fixes by its fixing section to the fixing region of the brake carrier, wherein the guiding section of the guiding means is received in the receiving region of the brake carrier, and wherein the brake pad carrier has at least one guiding protrusion which is displaceably guided in the guiding section of the guiding means.

The at least one fixing region of the brake carrier may be configured in the form of a protrusion. The elastic holding bracket and the holding section of the fixing section of the guiding means may in this case act on opposite side faces of the fixing region of the brake carrier.

In order to aid the fixing of the guiding means to the brake carrier, the fixing region of the brake carrier may have, on its opposite side faces, recesses in which the elastic holding bracket and the holding section of the fixing section of the guiding means can respectively engage.

Other advantages of this invention will become apparent to those skilled in the art from the following detailed description of the preferred embodiments, when read in light of the accompanying drawings.

DETAILED DESCRIPTION OF THE INVENTION

Figure 1:
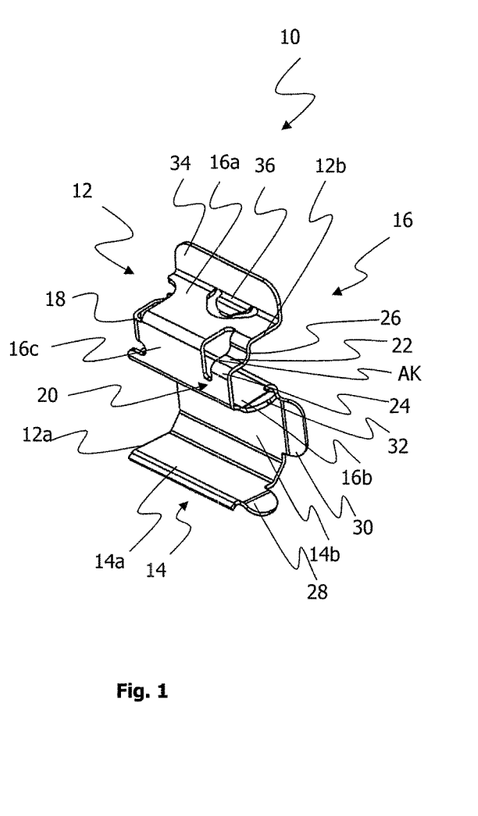
FIGS. 1 and 2 show perspective views of a guiding means according to a first embodiment of the invention.

FIG. 1 shows a guiding means 10 according to a first embodiment of the invention. The guiding means 10 has a base body 12 which comprises a guiding section 14 and a fixing section 16. Together the guiding section 14 and the fixing section 16 define the substantially S-shaped configuration of the base body 12 of the guiding means 10. The guiding means 10 is formed in one piece.

The guiding section 14 is provided for guiding a guiding protrusion of a brake pad arrangement (not shown). The guiding section 14 has a lower guiding surface 14a and an upper guiding surface (not visible in FIG. 1) located opposite the lower guiding surface 14a, these being connected to each other by a connecting surface 14b. The connecting surface 14b extends almost at right angles to the two guiding surfaces 14a located opposite each other.

The fixing section 16 comprises an upper contact surface 16a, a lower contact surface 16b, which are connected to each other via a stop surface 16c. Again, the stop surface 16c extends almost at right angles to the contact surfaces 16a and 16b.

A holding bracket 18 is partially visible in FIG. 1, the holding bracket being provided laterally on the stop surface 16c.

The stop surface 16c is additionally provided with a holding section 20. The holding section 20 comprising a holding surface 22 which extends substantially parallel to the contact surfaces 16a and 16b of the fixing section 16. The holding surface 22 is angled at one edge 24 and therefore runs in an angled manner relative to the stop surface 16c. The edge 24 extends substantially perpendicular to the side edges 12a, 12b of the base body 12 of the guiding means 10.

Figure 3:
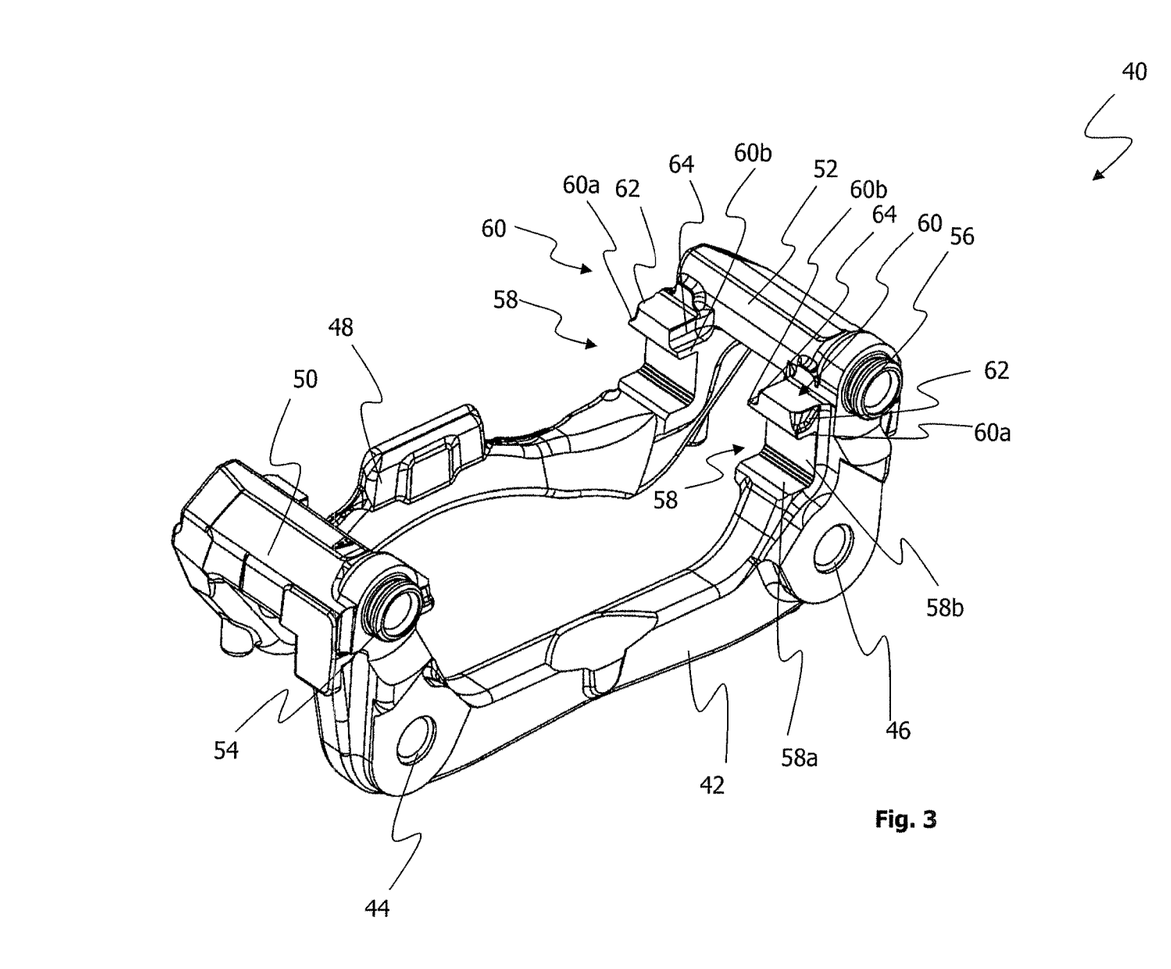
FIG. 3 shows a perspective view of a brake carrier according to a first exemplary embodiment.
Figure 4:
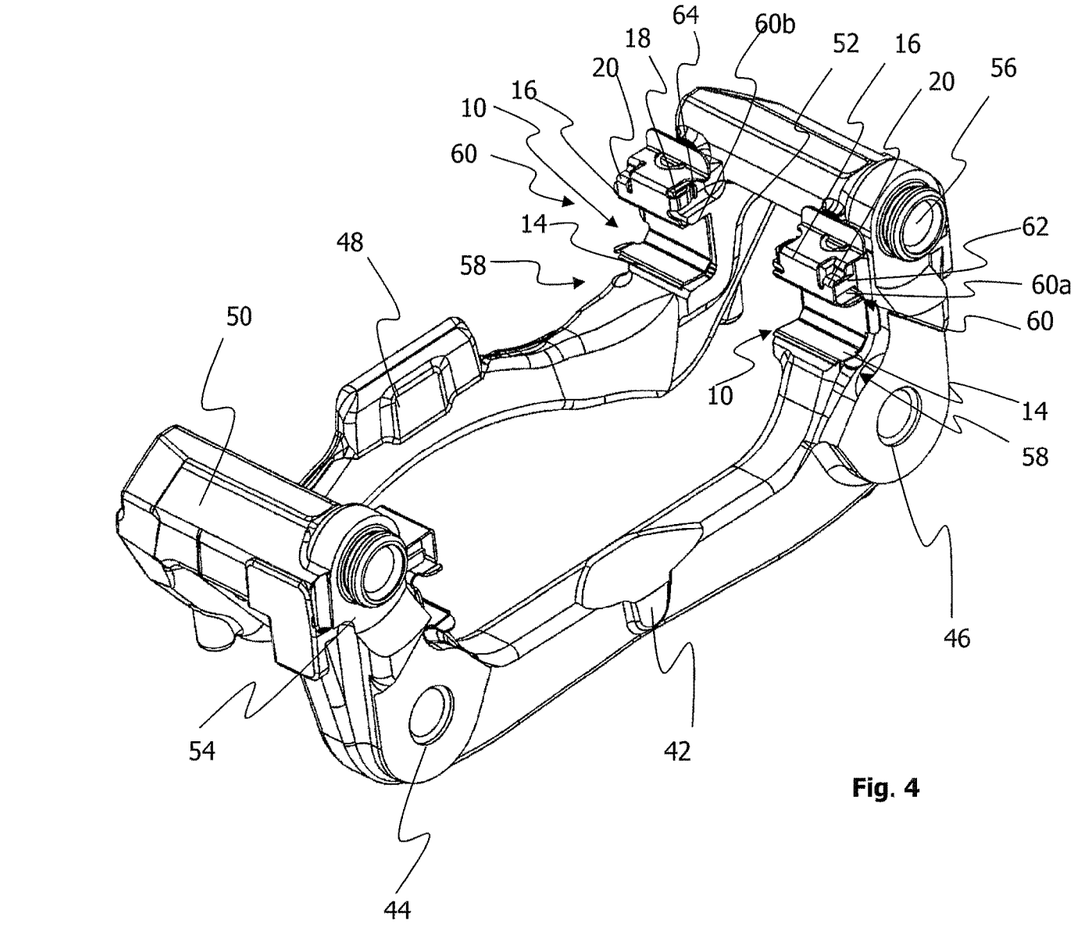
FIG. 4 shows a perspective view of the brake carrier according to FIG. 3 with guiding means according to the first embodiment of the invention attached thereto.
Figure 5:
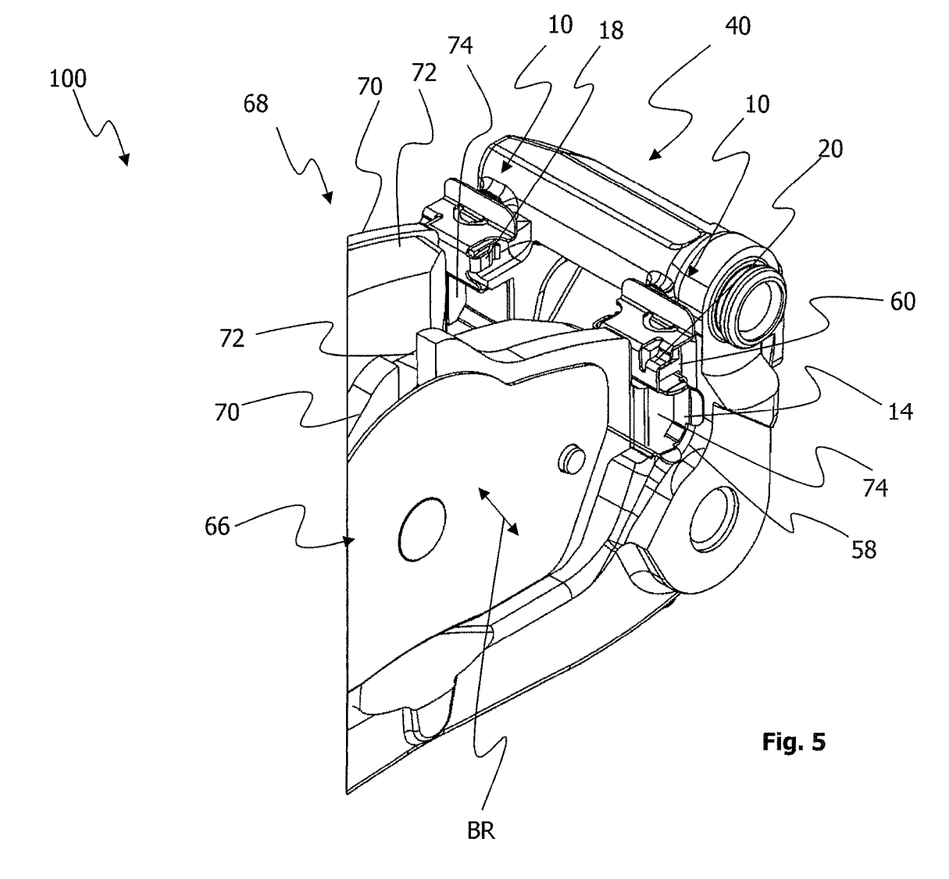
FIG. 5 shows a perspective view of a disk brake according to the invention.

A side edge AK of the holding surface 22 extends perpendicular to the edge 24 and can bear against the brake carrier when the guiding means 10 is attached to the brake carrier (see FIGS. 3 to 5). The length of the edge 24 and the side edge AK determine the size of the holding surface 22 and thus define the area by which the holding section 20 can absorb the forces and loads exerted on the guiding means 10.

According to this embodiment of the invention, the holding section 20 extends between the stop surface 16c and the contact surface 16a, that is to say that, besides the holding surface 22, the holding section 20 comprises a further section 26 which connects the holding surface 22 to the contact surface 16a. The holding section 20 thus extends in a stepped manner from the stop surface 16c to the contact surface 16a.

The guiding section 14 further comprises insertion tabs 28 and 30 which aid the insertion of a guiding protrusion of a brake pad arrangement (not shown). The guiding tabs 28, 30 run in an angled manner relative to the lower guiding surface 14a and the connecting surface 14c.

Also provided is a further tab 32 which runs in an angled manner relative to the lower stop surface 16b and can act as an insertion tab for a guiding protrusion of a brake pad arrangement (not shown) and additionally as a stop tab for a protrusion of a brake carrier (not shown), which is received in the fixing section 16.

The guiding means 10 has a head section 34, which extends at right angles to the contact surface 16a. Formed on the head section 34 is a latching projection 36 which extends in an angled manner from the head section 34 into the contact surface 16a.

FIG. 2 shows once again a perspective view of the guiding means 10 according to the first embodiment of the invention.

Figure 2:
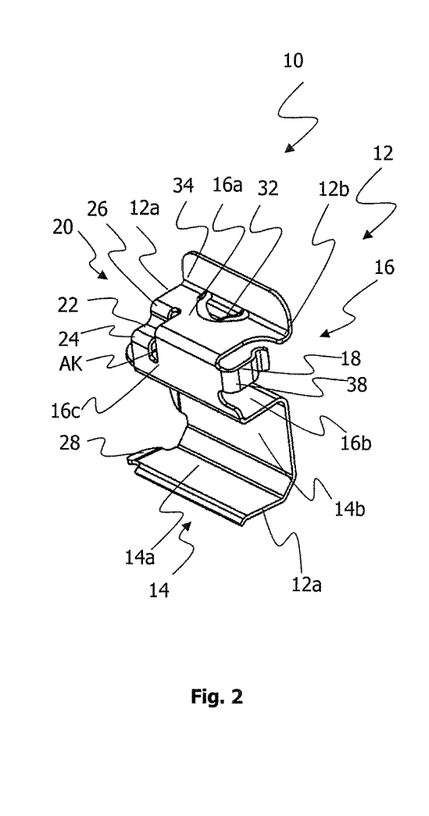

It is again possible to see in FIG. 2 the S-shaped configuration of the base body 12 of the guiding means 10 with the guiding section 14 and the fixing section 16.

The holding bracket 18 is shown more clearly in FIG. 2. The holding bracket 18 is provided on one side of the stop surface 16c or is formed on the side edge 12b of the base body 12. The holding bracket 18 extends substantially parallel to the contact surfaces 16a and 16b of the fixing section 16. The holding bracket 18 is bent at one edge 38 in the direction of the head section 34. The edge 38 runs almost perpendicular to the contact surfaces 16a and 16b of the fixing section 16. Due to its design, the holding bracket 18 is elastic and can serve for example for tolerance compensation for manufacturing tolerances during the fixing to a brake carrier (not shown).

FIG. 3 shows a perspective view of a brake carrier 40 according to a first exemplary embodiment.

The brake carrier 40 has a screw-on bracket 42, in which fixing openings 44 and 46 are formed. The fixing openings 44 and 46 serve for fixing the brake carrier 40 to a wheel carrier (not shown). Besides the screw-on bracket 42, the brake carrier 40 comprises a longitudinal bracket 48 running parallel to the screw-on bracket 42. The screw-on bracket 42 and the longitudinal bracket 48 are connected to each other via transverse braces 50 and 52. Formed in the transverse braces 50 and 52 are receiving openings 54 and 56, in which guide bolts (not shown) of a floating brake caliper (likewise not shown) can be received.

The brake carrier 40 further comprises a receiving region 58 and a fixing region 60 for the guiding means 10 shown in FIGS. 1 and 2. The receiving region 58 of the brake carrier 40 can receive the guiding section 14 of the guiding means 10 (not shown). The receiving region 58 is defined by surfaces 58a and 58b and by the underside (not shown) of the fixing region 60.

The guiding means 10 (FIGS. 1 and 2) can be fixed to the fixing section 60. The fixing section 60 is configured in the form of a protrusion and has a recess 62 and 64 on each of its opposite side faces 60a and 60b.

FIG. 4 shows a perspective view of the brake carrier 40 according to FIG. 3 with guiding means 10 attached thereto.

The fixing section 16 of the guiding means 10 is placed onto the fixing region 60 of the brake carrier 40, the fixing region being configured as a protrusion. In other words, the fixing section 16 of the guiding means 10 receives the fixing region 60 of the brake carrier 40 between the surfaces 16a, 16b, 16c of the holding bracket 18 and the holding section 20.

The holding bracket 18 and the holding section 20 of the fixing section 16 of the guiding means 10 engage in the grooves 62 and 64 on the opposite side faces 60a and 60b of the fixing region 60. Since the holding bracket 18 is elastic, manufacturing tolerances on the fixing region 60 of the brake carrier 40 can be compensated via the holding bracket 18. This is particularly necessary since the holding section 20 of the guiding means 10 is very stiff.

The guiding section 14 of the guiding means 10 is received in the receiving region 58 of the brake carrier 40, so that a guiding protrusion of a brake pad arrangement (not shown) can be guided in the guiding section 14 of the guiding means 10.

The holding section 20 engages in the recess 62 in the fixing region 60. The holding section 20 is thus adapted with its holding surface 22, which runs on the edge 24 (FIGS. 1 and 2) in an angled manner relative to the stop surface 16c, to the shape of the recess 62. Since the fixing region 60 with the recess 62 is configured in a stepped manner, the holding section 20 with its stepped shape can bear against the recess 62. In particular, the holding surface 22 and its side edge AK facing toward the fixing region 60 bear against the recess 62 and the side face 60a, respectively.

FIG. 5 shows a perspective view of a disk brake 100 for a motor vehicle brake system, but in which the brake disk per se is not shown.

Shown in FIG. 5 are brake pad arrangements 66 and 68 which each have a brake pad carrier 70 and a brake pad 72 attached to the brake pad carrier 70. Provided on the brake pad carrier 70 is a guiding protrusion 74 which is displaceably guided in the guiding section 14 of the guiding means 10. As already mentioned, the guiding section 14 of the guiding means 10 is received in the receiving region 58 of the brake carrier 40. In other words, the guiding section 14 bears with its surfaces 14a and 14b against the boundary surfaces of the receiving region 58 of the brake carrier 40.

The arrow BR in FIG. 5 indicates the direction of actuation of the brake pad arrangements 66 and 68, in which the brake pad arrangements 66 and 68 are moved when braking and when releasing the brake. When braking, the brake pad arrangements 66 and 68 are moved toward one another in the direction of the arrow BR, so as to be able to interact with a brake disk (not shown).

It is clear from this that, when the brake is actuated, the guiding means 10 or the holding section 20 of the guiding means 10 is loaded with the actuation force from the direction of the arrow BR via the guiding protrusion 74 of the brake pad arrangements 66 and 68. Even when the brake is not being actuated, vibrations occur during operation of a vehicle, the vibrations acting on the guiding means 10 or the holding section 20 in the direction of the arrow BR.

As can be seen from FIG. 5, the holding section 20 is formed on the guiding means 10 in such a way and the guiding means 10 is positioned on the brake carrier 40 in such a way that the stiff holding section 20 can absorb the actuation force of the brake pad arrangements 66 and 68 in the direction of the arrow BR, which force occurs in particular during actuation of the brake. The length of the edge 24 (FIGS. 1 and 2) and also the side edge AK of the holding surface 22 determine the area by which the holding section 20 can absorb the loads exerted on the guiding means 10.

Since the holding section 20 can reliably absorb the actuation force, the guiding means 10 has a high strength, which leads to a long lifespan of the guiding means 10.

In the embodiments of the invention which are described below, the same reference signs as those used in the first embodiment described above will be used for components which are identical or which act in an identical manner, but with a consecutive number being placed in front of the reference signs.

Figure 6:
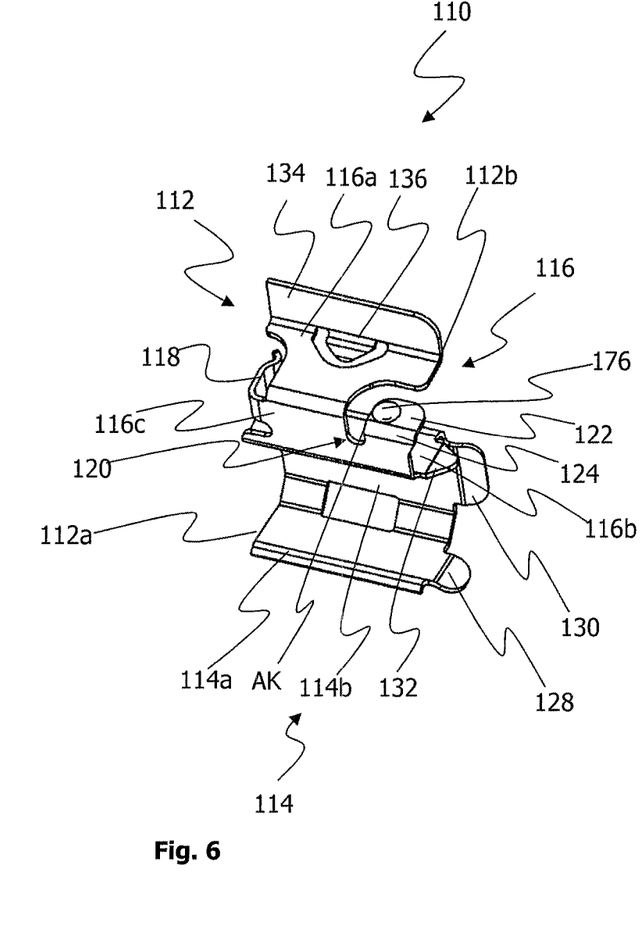
FIGS. 6 and 7 show perspective views of a guiding means according to a second embodiment of the invention.
Figure 7:
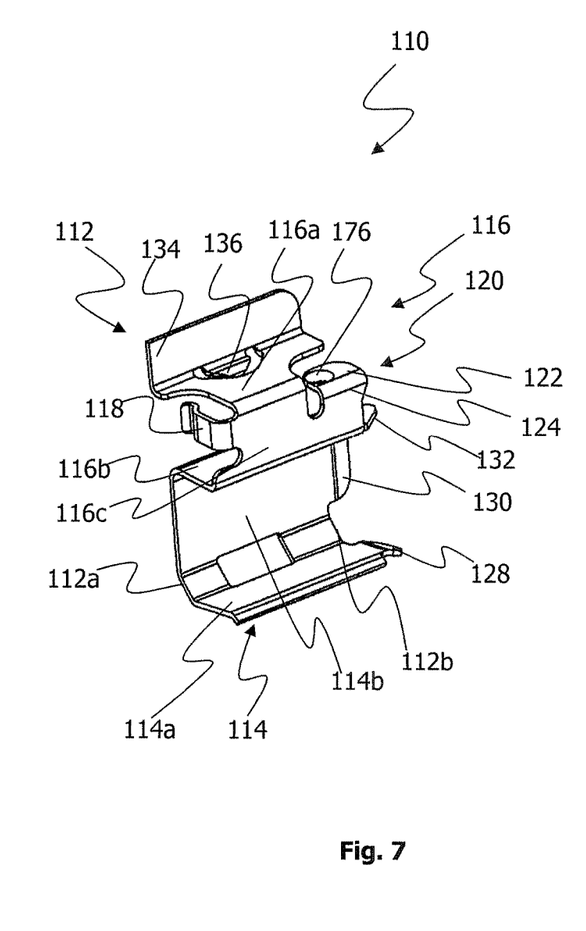

FIGS. 6 and 7 show perspective views of a guiding means 110 according to a second embodiment of the present invention.

Since the structure of the guiding means 110 according to the second embodiment is similar to the structure of the guiding means according to the first embodiment described above, only the differences between the two embodiments will be discussed here.

The guiding means 110 once again has a base body 112 having an S-shaped configuration. The base body 112 comprises a guiding section 114 and a fixing section 116.

As can already be seen from FIG. 6, the holding section 120 differs from the holding section 20 according to the first embodiment described above.

The holding section 120 according to this embodiment is formed only by a holding surface 122, which is angled at the edge 124. The holding surface 122 once again runs substantially parallel to the contact surfaces 116a and 116b of the guiding means 110 and thus perpendicular to the stop surface 116c.

It is possible to see on the holding surface 124 a depression 176 which leads to a bulge (not shown) on the holding surface 124. The depression 174 or the bulge formed thereby on the holding surface 124 serves to aid the fixing of the guiding element 110 to a brake carrier (not shown).

Figure 8:
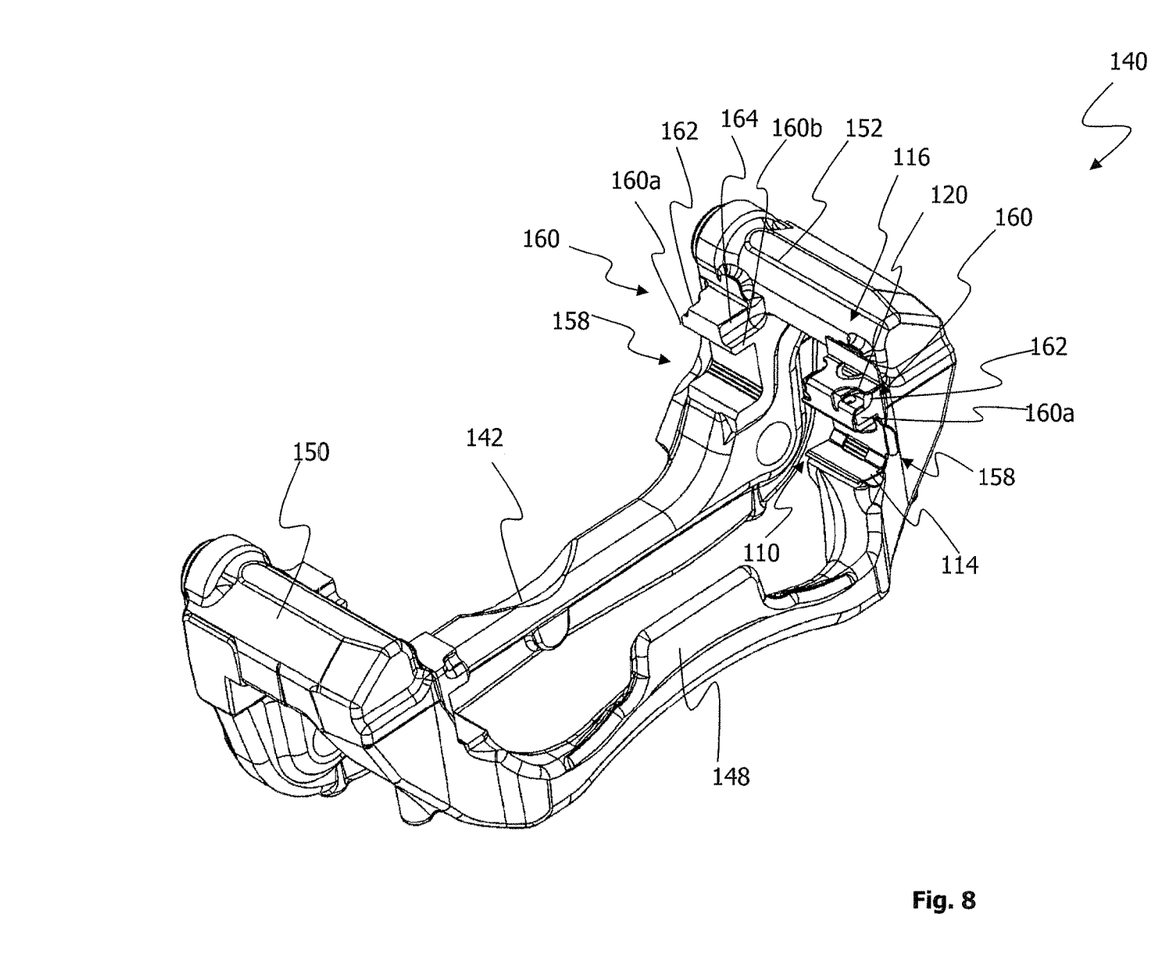
FIG. 8 shows a perspective view of a brake carrier according to a second exemplary embodiment with guiding means according to the second embodiment of the invention attached thereto.

FIG. 8 shows a perspective view of a brake carrier 140 according to a second exemplary embodiment of the invention.

A receiving region 158 and a fixing region 160 are formed on the brake carrier 140.

The opposite side faces 160a and 160b of the fixing region 160 are provided with recesses 162 and 164, in which the guiding element 110 engages with its holding bracket 118 and its stiff holding section 120.

The recess 162 on the fixing region 160, which fixing region is configured in the form of a protrusion, is adapted to the shape of the holding section 120 of the guiding element 110.

The depression 176 on the holding surface 124 serves to engage in the recess 162 on the fixing region 160.

Figure 9:
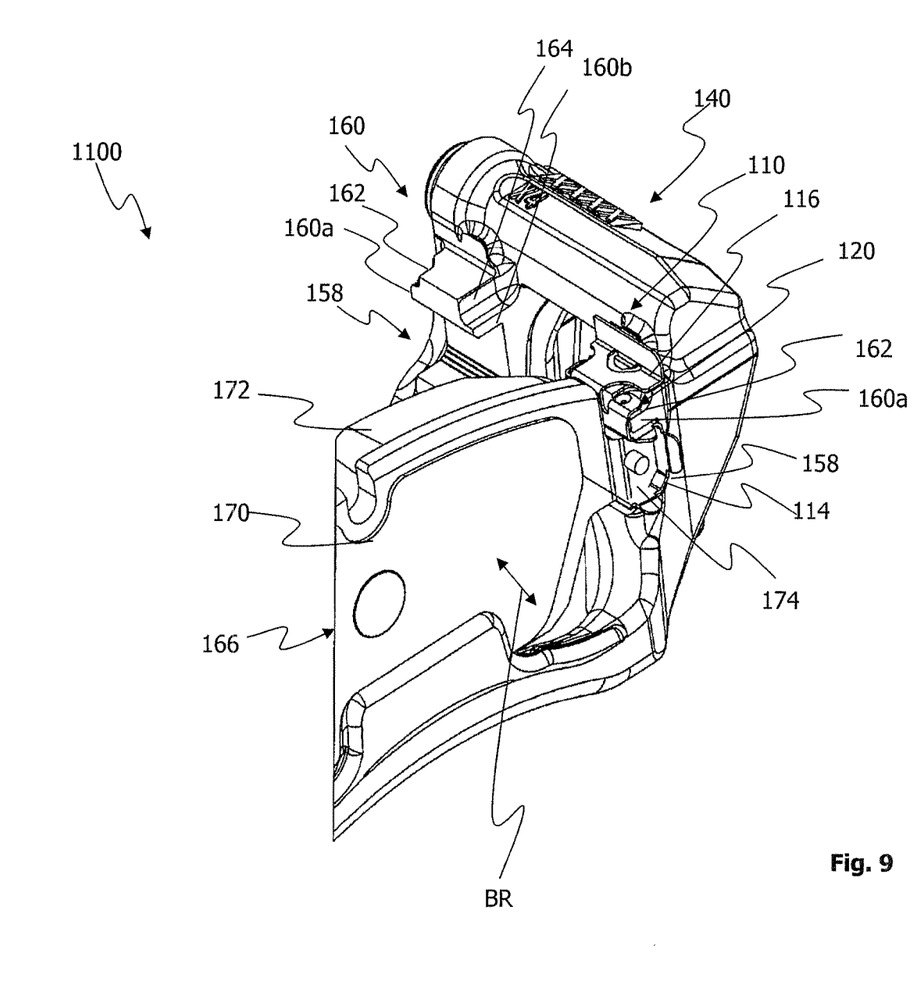
FIG. 9 shows a perspective view of a disk brake according to the invention.

FIG. 9 shows a disk brake 1100 with a guiding means 110 according to the second embodiment of the invention, which is arranged on a brake carrier 140 according to the second exemplary embodiment.

The guiding section 174 on the brake pad carrier 170 of the brake pad arrangement 166 is once again displaceably guided in the guiding section 114 of the guiding means 110, wherein the guiding section 114 is received in the receiving region 158 of the brake carrier 140, that is to say that the surfaces 114a and 114b of the guiding section 114 bear against the boundary walls of the receiving region 158 of the brake carrier 140.

Figure 10:
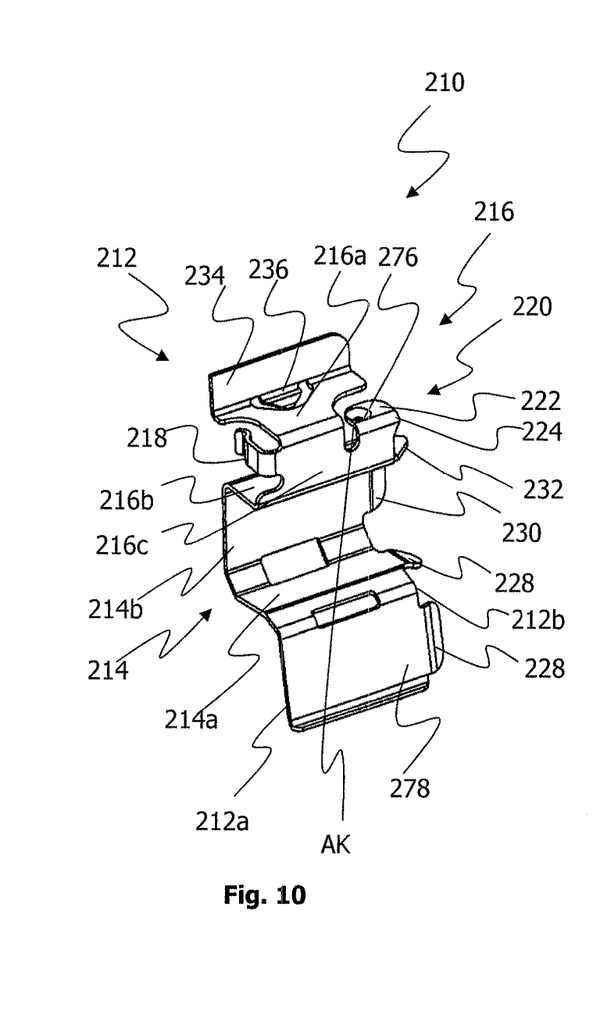
FIGS. 10 and 11 show perspective views of a guiding means according to a third embodiment of the invention.
Figure 11:
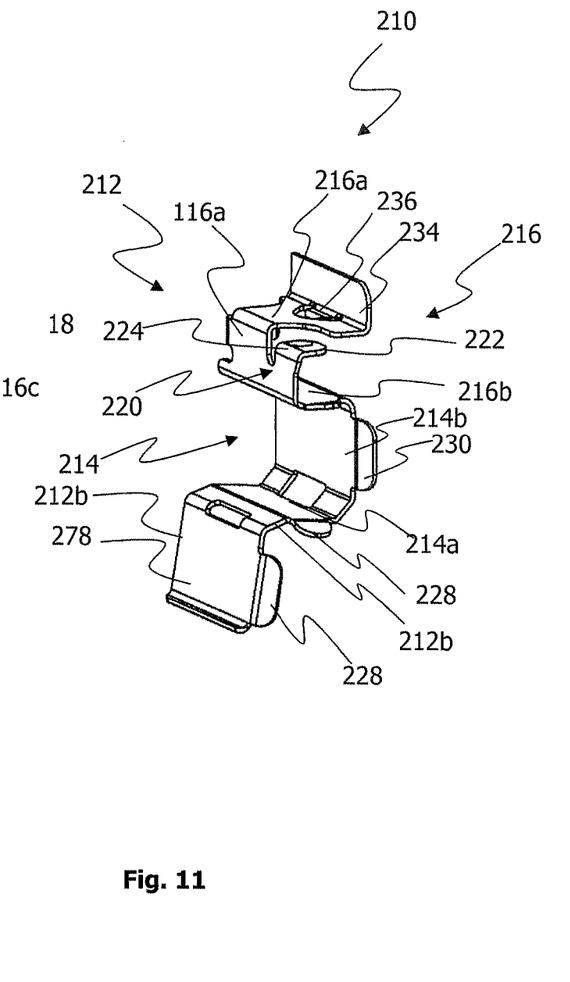

FIGS. 10 and 11 show perspective views of a guiding means 210 according to a third embodiment of the present invention.

The third embodiment of the guiding means 210 largely corresponds to the second embodiment described above.

On the guiding means 210 according to the third embodiment, the lower guiding surface 214a is adjoined by a further guiding surface 278, which runs in an angled manner relative to the guiding surface 214a.

Figure 12:
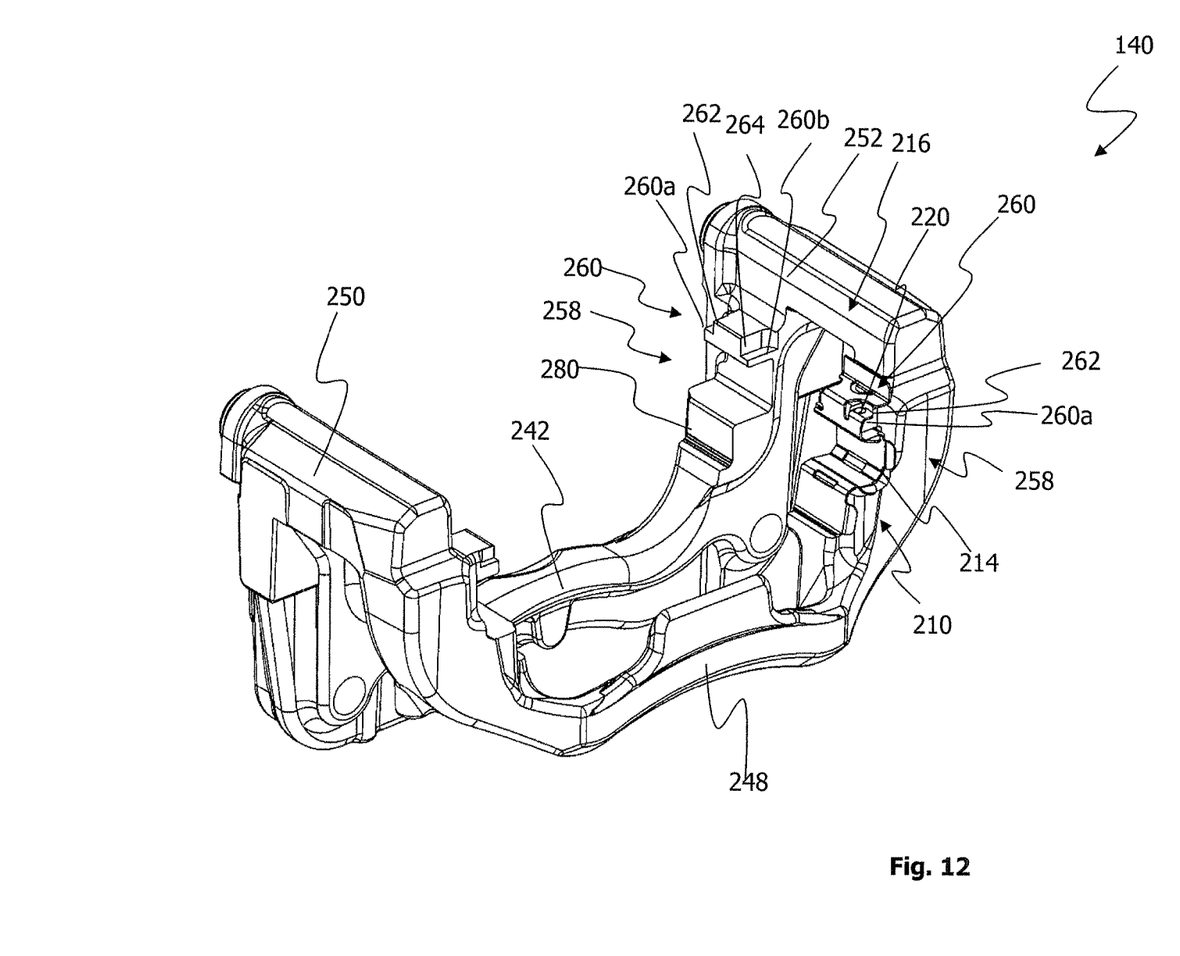
FIG. 12 shows a perspective view of a brake carrier according to the third exemplary embodiment with guiding means according to the third embodiment of the invention attached thereto.

FIG. 12 shows a brake carrier 240 according to a third exemplary embodiment, on which a supporting surface 280 is provided for supporting the guiding means 210. The guiding surface 278 of the guiding means 210 bears against the supporting surface 280.

Figure 13:
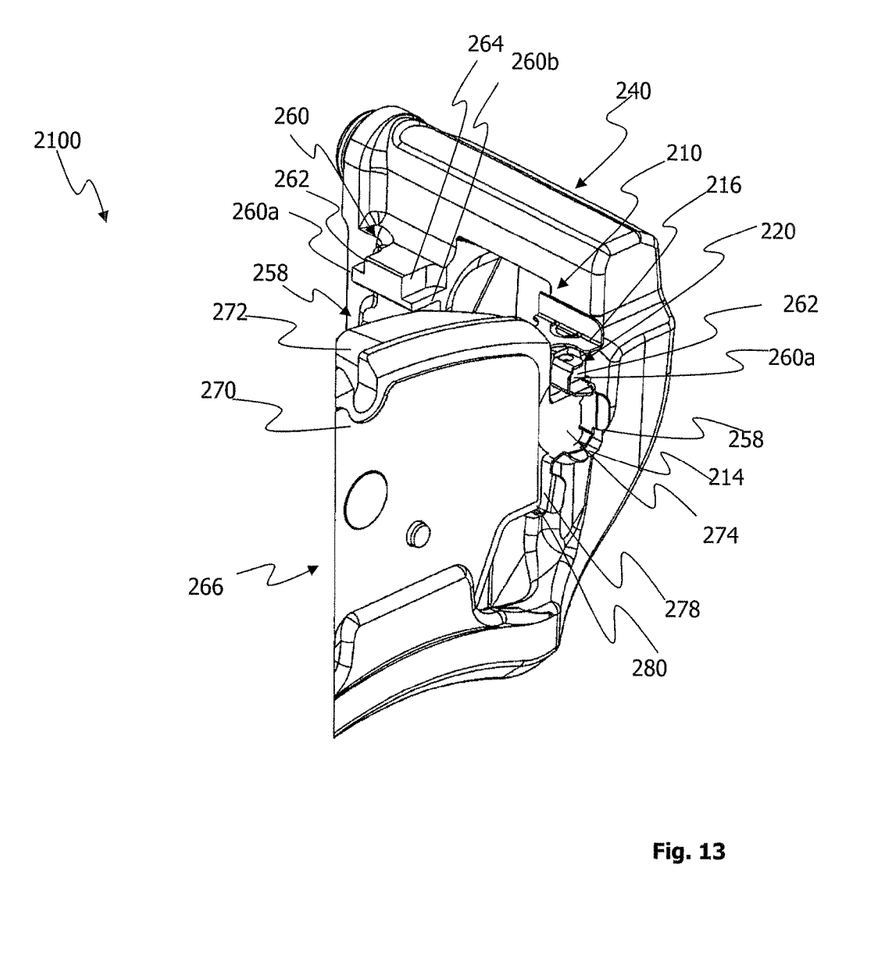
FIG. 13 shows a perspective view of a disk brake according to the invention.

FIG. 13 shows a perspective view of a disk brake 2100 with a guiding means 210 according to the third embodiment and a brake carrier 240 according to the third exemplary embodiment.

It can be seen here that the brake pad carrier 370 of the brake pad arrangement 366 according to this exemplary embodiment is configured in such a way that it bears with its peripheral edge 282 against the guiding surface 278 of the guiding means 210, which is supported against the supporting surface 280 of the brake carrier 140.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A guiding means for a brake pad arrangement of a disk brake, with
a base body which comprises:
a guiding section provided for guiding a guiding protrusion of the brake pad arrangement, and
a fixing section which is provided for fixing the guiding means to a brake carrier,
wherein the fixing section has two contact surfaces and a stop surface connecting the two contact surfaces,
wherein at least one elastic holding bracket is provided on the stop surface, said at least one elastic holding bracket is in holding engagement with the brake carrier at least in some sections,
wherein at least the stop surface is provided with a stiff holding section which can be brought into contact with the brake carrier at least in some sections and which is arranged on the guiding means in such a way that, when attached to a brake carrier, the holding section is loaded by the actuation force of the brake pad arrangement,
wherein the holding section comprises at least one holding surface which is provided for bearing against the brake carrier, wherein the holding surface comprises a side edge configured to bear against the brake carrier, when the guiding means is attached to the brake pad arrangement, wherein the side edge extends perpendicular to the direction of the actuation force of the brake pad arrangement, wherein the stiff holding section and the elastic holding bracket are arranged at opposite sides of the at least one stop surface in such a way that a fixing region of the brake carrier is received between the stiff holding section and the elastic holding bracket, when the guide means is attached to the brake pad arrangement.

2. The guiding means according to claim 1,
wherein the holding surface runs in an angled manner relative to the stop surface in such a way that the holding surface extends substantially parallel to the contact surfaces.

3. The guiding means according to claim 2,
wherein the holding surface is angled along an edge which extends substantially perpendicular to the side edges of the base body.

4. The guiding means according to claim 1,
wherein the holding section extends between the stop surface and at least one of the contact surfaces, wherein the holding surface is connected to the at least one contact surface.

5. The guiding means according to claim 1,
wherein the holding surface is provided with a bulge.

6. The guiding means according to claim 1,
wherein lateral insertion tabs are formed on the guiding section.

7. The guiding means according to claim 1,
wherein at least one stop tab is formed on the guiding means.

8. The guiding means according to claim 1,
wherein the guiding means is made of sheet metal.

9. A disc brake for a motor vehicle brake system comprising:
- at least one brake pad arrangement which has a brake pad carrier and a brake pad attached to the brake pad carrier, which brake pad can be brought into interaction with a brake disk in order to achieve a braking effect,
- at least one brake carrier which has at least one receiving region and at least one fixing region, and
- at least one guiding means according to claim 1 which fixes by the fixing section to the fixing region of the brake carrier and the guiding section of the guiding means is received in the receiving region of the brake carrier, wherein the brake pad carrier has at least one guiding protrusion which is displaceably guided in the guiding section of the guiding means.

10. The disk brake according to claim 9,
wherein the at least one fixing region of the brake carrier is configured in the form of a protrusion, wherein the elastic holding bracket and the holding section of the fixing section of the guiding means act on opposite side faces of the fixing region of the brake carrier.

11. The disk brake according to claim 10,
wherein the fixing region has, on the opposite side faces, recesses in which the elastic holding bracket and the holding section of the fixing section of the guiding means respectively engage.

\* \* \* \* \*